United States Patent [19]

Korsmeyer

[11] Patent Number: 5,056,715

[45] Date of Patent: Oct. 15, 1991

[54] APPARATUS FOR MIXING AND SPRAYING A SLURRY

[75] Inventor: Richard W. Korsmeyer, Groton, Conn.

[73] Assignee: Pfizer Inc., New York, N.Y.

[21] Appl. No.: 482,623

[22] Filed: Feb. 21, 1990

[51] Int. Cl.$^5$ ............................................. B05B 9/03
[52] U.S. Cl. ................................ 239/214; 239/224; 222/333; 222/410; 222/414; 366/176; 415/90; 118/303
[58] Field of Search ..................... 239/214, 223, 224; 222/333, 410, 414; 366/163, 164, 168, 176, 315; 415/90; 118/303

[56] References Cited

U.S. PATENT DOCUMENTS

| | | | |
|---|---|---|---|
| 3,272,441 | 9/1966 | Davis et al. | 239/403 |
| 3,275,063 | 9/1966 | Tallor | 159/4 |
| 3,310,240 | 3/1967 | Grundman | 239/404 |
| 3,371,869 | 3/1968 | Hughes | 239/102 |
| 3,408,007 | 10/1968 | Raichle et al. | 239/132 |
| 3,421,693 | 1/1969 | Fraser | 239/15 |
| 3,521,370 | 7/1970 | Senatore | 34/9 |
| 3,533,558 | 10/1970 | Masters | 239/404 |
| 3,794,449 | 2/1974 | Brouwer | 415/90 |
| 4,042,653 | 8/1977 | Beyn | 264/7 |
| 4,347,032 | 8/1982 | Posseu | 415/90 |
| 4,416,548 | 11/1983 | Carre et al. | 366/168 |
| 4,421,412 | 12/1983 | Hold et al. | 366/315 X |
| 4,753,374 | 6/1988 | Jähn et al. | 222/414 |
| 4,884,892 | 12/1989 | Gust | 366/168 X |

FOREIGN PATENT DOCUMENTS 2746489 4/1979 Fed. Rep. of Germany .
424611 6/1972 U.S.S.R. .
1124578 8/1968 United Kingdom .

OTHER PUBLICATIONS

Takenaka et al., Preparation of Enteric-Coated Microcapsules for Tableting by Spray-Drying Technique and In Vitro Simulation of Drug Release from the Tablet in GI Tract, Journal of Pharm. Sciences, 69:1388-1392 (1980).

Asker et al., Some Spray-Dried Formulations of Sulfaethylthiadiazole for Prolonged-Release Medication, Journal of Pharm. Sciences, 55:90-93 (1966).

Hall, H. S. et al., The Wurster Process in *Controlled Release Technologies: Methods, Theory & Applications*, vol. II, A. Kydonieus, ed. CRC Press, Boca Raton, FL (1980) pp. 137-138.

Primary Examiner—Andres Kashnikow
Assistant Examiner—William Grant
Attorney, Agent, or Firm—Peter C. Richardson; J. Trevor Lumb; A. Dean Olson

[57] ABSTRACT

An apparatus for mixing and spraying a slurry. The apparatus comprises a housing including a channel. The channel is in fluid communication with an inlet at its upstream end and curves to an outlet at its downstream end. The outlet is in fluid communication with an air atomization nozzle. A mixing surface is capable of rotation with respect to the housing and the channel is open to the mixing surface.

11 Claims, 3 Drawing Sheets

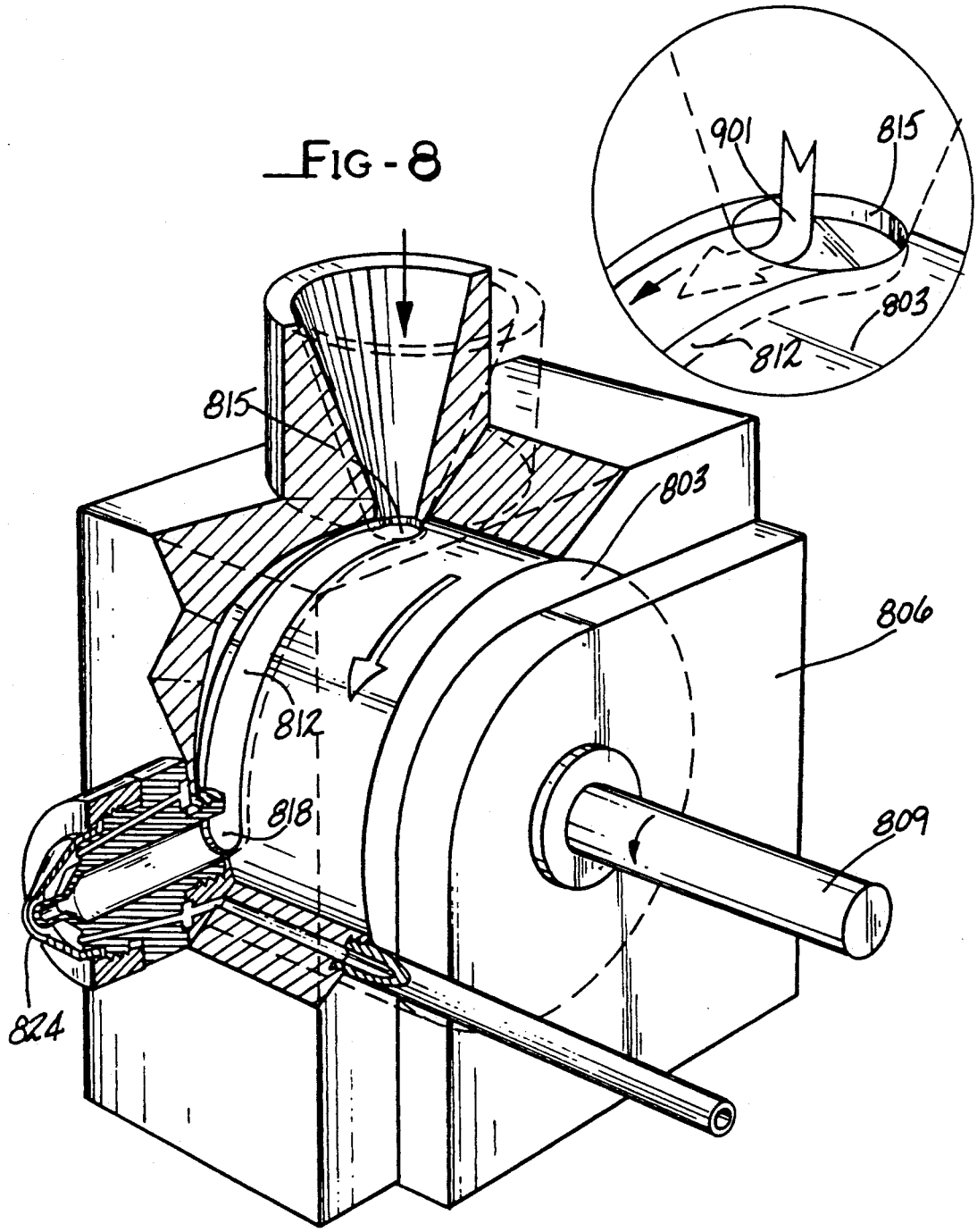

APPARATUS FOR MIXING AND SPRAYING A SLURRY

CROSS-REFERENCE TO RELATED APPLICATION

Attention is directed to commonly assigned, copending application, our docket no. PC7733ADO, filed on even date herewith, entitled "Apparatus and Method for Mixing and Spraying a Slurry" which discloses similar apparatuses, the disclosure of which is incorporated by reference.

TECHNICAL FIELD

The field of art to which this invention pertains is apparatuses for mixing solid particles with a liquid and spraying the resulting slurry.

BACKGROUND ART

The production of coated small particles for use in the drug industry is widely known. Typically fluidized bed systems, such as the Wurster process coater have been used. Hall, H. S. & Pondell, R. E., "The Wurster Process" in *Controlled Release Technologies: Methods, Theory & Applications, Vol. II.* A. Kydonieus, ed. CRC Press, Boca Raton, FL 1980, pp. 137-138. In the fluidized bed coating chamber, the solids to be coated are suspended in a heated stream of air. The coating material is sprayed onto the suspended solids until the desired amount of coating has been applied. The coating solution is sprayed slowly over a period of time, so that the fluidized particle bed does not become wet and sticky, resulting in agglomeration. The problem of agglomeration becomes more serious as the size of the core particles decreases, and is particularly acute when coating particles smaller than about 300 μm. The necessity of applying the coating slowly means that each particle receives its coating in many incremental steps as the particle moves through the bed from a region near the coating nozzle to a distant region and back, continuing the cycle throughout the process.

Efforts have been made to replace the slow, incremental coating method with techniques which can produce a coated solid particle in a single rapid step. One technique which has been used is to spray-dry the core material in a film-forming solution of the coating material. The use of ordinary spray-drying atomizers for the process necessitates the use of very small core particles (A. F. Asker and C. H. Becker, J. Pharm. Sci. 55(1), 90 (1966)). In fact, the difficulty of using this process to coat preformed solid particles is such that most workers have chosen instead to utilize a co-solution of core and coating material. (ibid.; H. Takenaka, Y. Kawashima, and S-Y. Lin, J. Pharm. Sci. 69(12), 1388 (1980); Senatore, U.S. Pat. No. 3,521,370.)

Although these fluid bed coaters and spray dryers are effective for many applications, there is a continuing search for improved coating apparatuses.

SUMMARY OF THE INVENTION

This invention is directed to an apparatus for mixing and spraying a slurry. The apparatus comprises a housing including a channel. The channel is in fluid communication with an inlet at its upstream end and curves to an outlet at its downstream end. The outlet is in fluid communication with an air atomization nozzle. A mixing surface is capable of rotation with respect to the housing and the channel is open to the mixing surface.

Other features and advantages will be apparent from the specification and claims and from the accompanying drawings which illustrate embodiments of this invention.

BRIEF DESCRIPTION OF THE DRAWINGS

FIG. 6 illustrates an exploded perspective view of the inlet portion of the apparatus of FIG. 1.

FIG. 7 illustrates a schematic exploded perspective view of the inlet portion of a screw feed pump.

FIG. 8 illustrates a perspective view partly broken away and partly in cross-section of another mixing and spraying apparatus of this invention.

FIG. 9 illustrates an exploded perspective view of the inlet portion of the apparatus of FIG. 8.

DETAILED DESCRIPTION OF THE INVENTION

Figure 1:
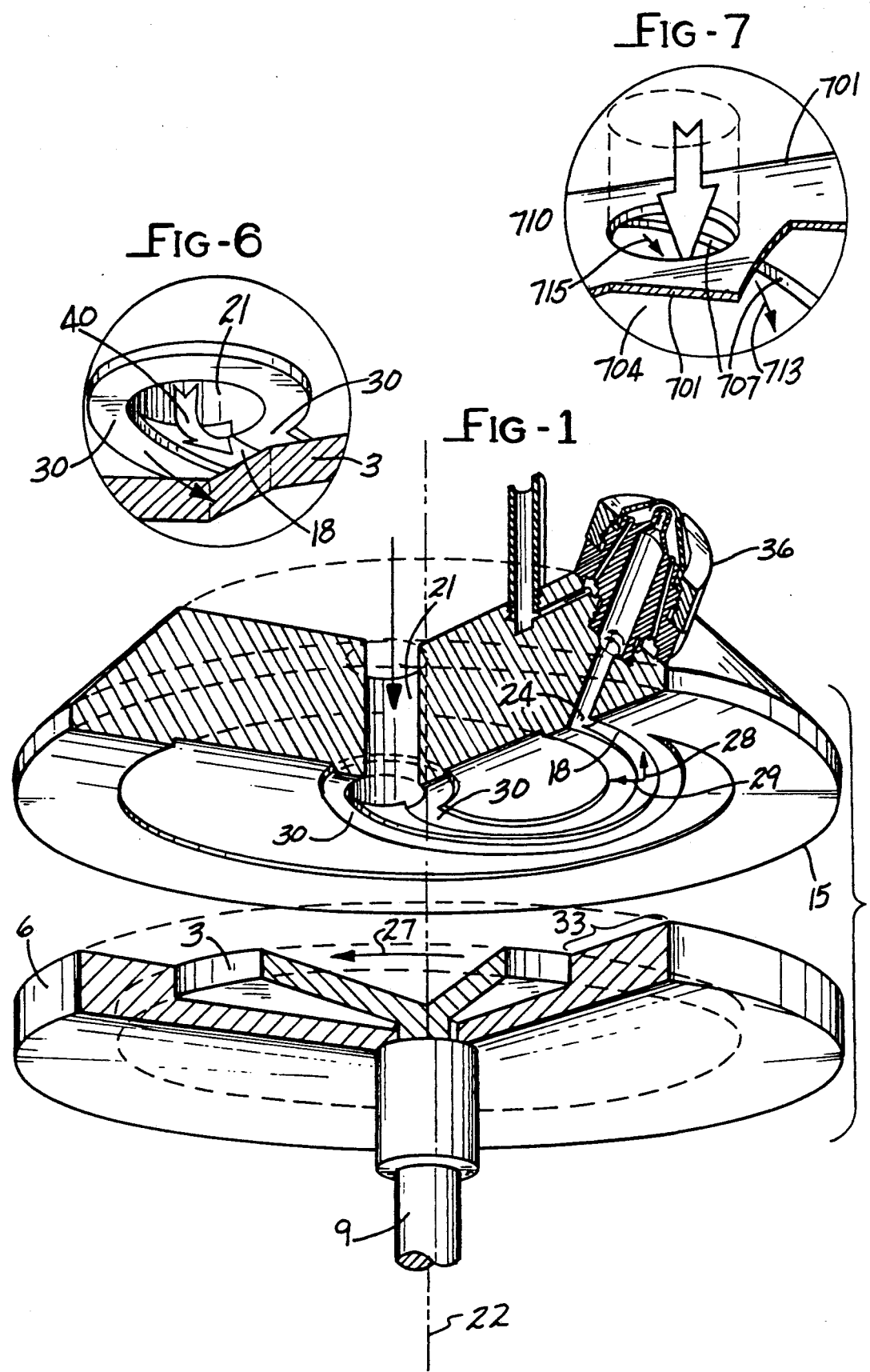
FIG. 1 illustrates a perspective view partly in cross-section of a mixing and spraying apparatus of this invention.

A clearer understanding of the invention may be had by reference to FIG. 1. A disk 3 is suitably mounted in a housing 6 so that it rotates freely. The disk 3 functions as a mixer and pump as it rotates and contacts the material to be mixed/transported. A driving means such as a drive shaft 9 (driven by a motor) is connected to and rotates the disk 3. A housing cover 15 is disposed over and suitably fastened to the housing 6. Channel 18 curves from an upstream inlet 21 near, but apart from the center 22 of the disk 3 to a downstream outlet 24 farther from the center 22 of the disk 3. The channel 18 is curved in the direction of the disk 3 rotation 27. Preferably, the upstream inlet 21 is off center from the rotating disk 3 center 22 as that provides driving frictional force to transport material from the inlet 21 downstream. Stated alternatively if the inlet 21 was disposed at the rotating disk center material placed there would spin inhibiting downstream transport.

In addition to transporting a fluid downstream shear gradients are introduced which contribute to substantial mixing of the fluid. The mixing facilitates maintaining solid particles suspended in a fluid. Thus, there is a radial velocity component 28 that contributes to fluid transport downstream and a circumferential velocity component 29 that aids in mixing of fluid. Restated, mixing is facilitated because the channel forms an angle with respect to the direction of the disk rotation.

Figure 2:
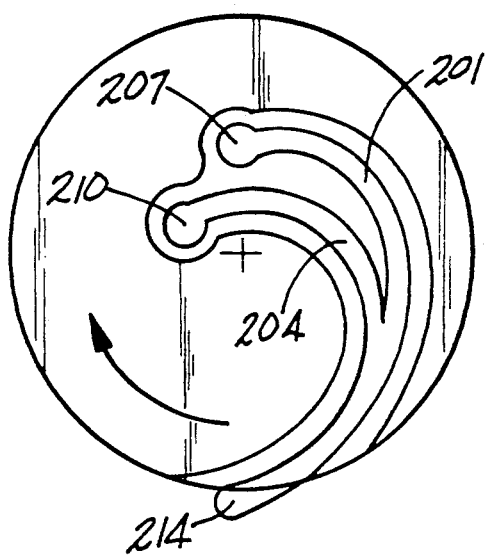
FIGS. 2-5 illustrate schematic top views of FIG. 1 showing alternative channel configurations.
Figure 3:
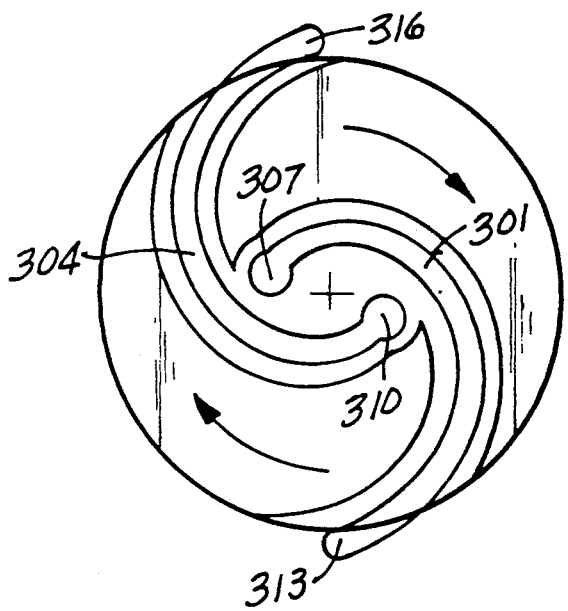
Figure 4:
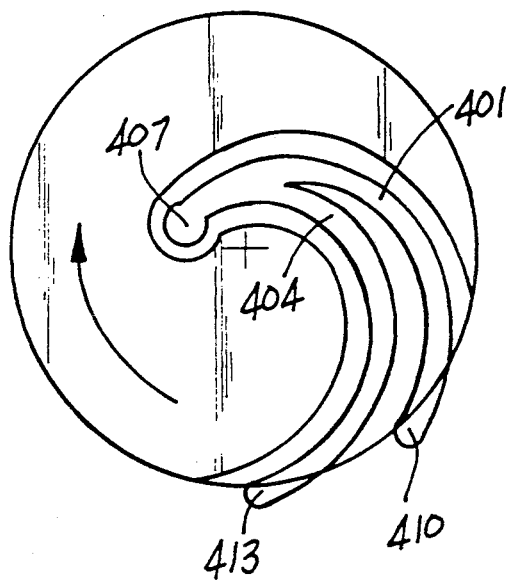
Figure 5:
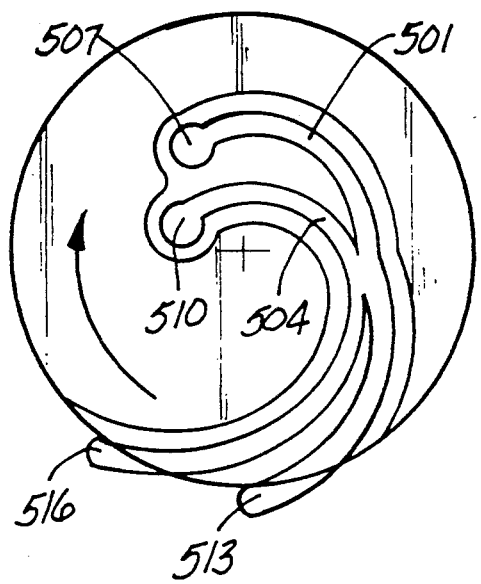

A variety of other configurations can be envisioned as exemplified in FIGS. 2-5. In FIG. 2 channels 201, 204 have separate upstream inlets 207 and 210 respectively and channels 201 and 204 are in fluid communication and share a common outlet 214. This configuration can be used advantageously where separate feedstreams are desirable. In FIG. 3 separate channels 301, 304 have separate inlets 307 and 310 respectively. The channels 301 and 304 are spaced apart and lead to separate outlets 313 and 316 respectively. Thus channels 301 and 304 may be used in conjunction to increase the throughput of the pump. In FIG. 4 channels 401 and 404 share a common upstream inlet 407 yet have separate downstream outlets 410 and 413 respectively. Again, this configuration may be used to increase the throughput of the pump. In FIG. 5 separate channels 501, 504 have separate inlets 507 and 510 respectively. Channels 501, 504 lead to separate outlets 513, 516 respectively, but channels 501 and 504 are in fluid communication. This configuration increases throughput and provides for mixing of two component systems. The above configurations merely exemplify the variety of configurations possible. Clearly a variety of other configurations including, for example, various combinations of more channels having common inlets or outlets or additional separate channels may be envisioned.

For applications where a slurry is fed into the channel the apparatus is preferably substantially airtight. This reduces clumping when volatile solvents are used. For applications where solid particulates are added separate from liquids the particulates are preferably added upstream from the liquid addition. This also reduces clumping particularly if air is introduced with the solids. Thus, it is preferable that for separate additions of particulates and volatile liquids the apparatus is substantially airtight, however if the volatile liquids are introduced downstream of the particulate addition, and the apparatus is substantially airtight downstream of the particulate addition, then clumping is also inhibited. These features also apply, for example, to the embodiment illustrated in FIG. 8.

Typically the housing cover 15 is milled so the cover is spaced apart from the rotating disk 3 except for the channel walls 30 which are in continuous frictional contact with the rotating disk surface 3 or housing perimeter 33. The separation of the housing cover 15 from the rotating disk 3 external to the channel walls 30 reduces unproductive frictional drag resulting in a more efficient pump.

Alternative configurations include, for example, mixers that that do not have a housing 6 perimeter 33 surrounding the rotating disk 3.

The channel 18 typically has a continuous channel wall 30 enclosing the inlet 21, channel 18, and outlet 24. The channel wall is in continuous contact with the disk 3 and in some configurations the perimeter 33 surrounding the disk.

The degree of curvature can vary depending on the desired application. Typically the straighter the curve the less velocity is imparted to the fluid to be pumped. In contrast a spiral curve imparts greater velocity to the slurry until the velocity component is lowered by the increase in pressure drop.

It is preferred that the channel distance from the farthest downstream point of contact between the channel 18 and disk 3 to the nozzle (e.g. dead distance) is as short as possible as this facilitates a smooth fluid flow (e.g. no clumping). This is particularly important with this invention as the pumping force results from the friction of the disk 3 contacting the slurry.

In yet another configuration the channel curves axially to the disk 3 into the housing cover 15 so that the channel is separated for some desired distance from the disk 3 before the channel again contacts the disk 3. As desired another inlet may be in fluid communication with the channel during that separation from the disk.

It has been found that the mixing pump of this invention is particularly applicable to pumping slurries of fragile particles. For example in FIG. 6 the arrow 40 illustrates that there is always an open channel from inlet 21 to channel 18 (e.g. disk 3 is always spaced apart from the inside channel 30 surface). In contrast FIG. 7 illustrates that a pump comprising a tube 701 having an inlet 704 disposed along the tube 701 and a screw drive 707 (that mates with the inner surface of the tube 701) can crush particles as the screw thread passes by the inlet hole, particularly at the upstream end 710 of inlet 704, in the direction of the arrows 713. This difference also applies to other traditional pump designs, such as rotary vane, gear, etc.

FIG. 8 illustrates another mixing and pumping apparatus of this invention. According to FIG. 8 a drum 803 is suitably mounted in a housing 806 so that it rotates freely. A driving means such as a drive shaft 809 (driven by a suitable motor) is connected to and rotates the drum 803. Channel 812 (disposed in the housing 806) curves from an upstream inlet 815 in the housing 806 around the drum 803 to a downstream outlet 818. The channel 812 may have a continuous channel wall enclosing the inlet 815, channel, 812 and outlet 818. The channel wall is in continuous contact with the drum 803. As the drum 803 turns it provides a driving frictional force to transport material from the inlet 815 downstream to the outlet 818.

In a similar fashion to the pump described previously and depicted in FIG. 1 a variety of configurations can be envisioned other than that which is depicted in FIG. 8. For example the channel 812 may form an S pattern instead of the straight line (although curved around the drum) depicted. These other shapes facilitate greater mixing. The degree of curvature can vary depending on the desired application. Typically the straighter the channel the greater velocity is imparted to the fluid to be pumped. In contrast a spiral channel imparts less velocity to the slurry. As before a variety of inlet, outlet, and channel configurations may be combined to achieve greater throughput, mixing of two component systems etc.

In a similar fashion to the pump previously described, the housing 806 may be milled so that the housing 806 is spaced apart from the rotating drum 803 except for walls which form the channel 812. As before this separation reduces unproductive frictional drag resulting in a move efficient pump.

It is preferred that any channel distance (e.g. radial) from the farthest downstream point of contact between the channel 812 and drum 803 to the outlet 818 (e.g. dead distance) is as short as possible as this facilitates smooth fluid flow (e.g. no clumping). This is particularly important with this invention as the pumping force merely results from the friction of the drum 803 contacting the slurry.

In yet another configuration the channel 812 curves away from the drum 803 into the housing 806 so that the channel is separated for some desired distance from the drum 803 before the channel again contact the drum 803. As desired another inlet may be in fluid communication with the channel during that separation from the disk.

In a similar fashion to the previous pump it has been found that this pump tends not to crush fragile particles. In FIG. 9 the arrow 901 illustrates that there is always an open channel from inlet 815 to channel 812 (e.g. the drum 803 (also indicated by arrows 904) is spaced apart from the inside channel 812 surface). In contrast as illustrated in FIG. 7 and previously stated a pump comprising a tube 701 having an inlet 704 disposed along the tube 701 and a screw drive 707 (that mates with the inner surface of the tube 701) can crush particles as the screw thread passes by the inlet hole, particularly at the upstream end 710 of inlet 704, in the direction of the arrows 713.

Typically an external air atomization mixing nozzle 36, 824 is utilized for the above pumps since internal mixing nozzles can result in clogging, particularly for those liquids that thicken with exposure to air. Generally a straight unobstructed flow path and uniformly convergent nozzle facilitates the transport of the slurry and dispersion thereof from the nozzle exit. Preferably any atomizing nozzle that breaks the slurry into droplets that are of about the size of the solid particles (being mixed) may be used. Slotted opening nozzles may be used to increase throughput. Preferably, the shorter dimension of the slot has a length such that the liquid stream breaks up into droplets approximately the size of solid particles.

These mixing and spraying apparatuses may be used to advantage with a variety of two component systems that are flowable. These include liquid-liquid, liquid-solid and gas-liquid. These apparatuses are particularly advantageous when utilized with liquidsolid systems such as drug delivery systems used in the pharmaceutical industry.

Although any solid particulate may be used with the apparatus of this invention those friable particles having a size up to about 2 mm are used advantageously in this apparatus. Of particular importance are those friable solid particles having a size of about 2.0 mm to about 100 microns because these are not effectively dispersed by other spray apparatuses.

In addition, the apparatus is of particular utility when used with solids that are soluble or partially soluble in a liquid (such as described below) that is used as part or all of a solid-liquid system. The apparatus can mix the phases and spray the slurries prior to the solid's dissolution by the solvent.

Any composition may be used for the solid including pharmaceutical compositions such as nonpareils, particles produced by milling, by extrusion/ spheronization, antiinfectives, antiinflammatories, analgesics, etc.

Any liquid may be used in this apparatus including those useful in the pharmaceutical industry. Combinations of liquids may also be used. Of particular importance are high viscosity liquids of about 300 cps to about 1000 cps and above, since it is difficult to spray these, particularly when in combination with the above described solids. Of particular importance are solutions of polymers in volatile solvents because evaporation of the solvent may lead to clogging of the nozzle.

Examples include solutions of cellulose esters, such as cellulose acetate, cellulose acetate butyrate, cellulose acetate proprionate, cellulose acetate phthalate, or nitrocellulose; or cellulose ethers, such as ethylcellulose in solvents such as acetone, methyl ethyl ketone, or methylene chloride and in mixtures of such solvents with non-solvents such as ethanol, propanol, butanol, glycerol, or water. Also useful are solutions of such polymers as poly(vinyl alcohol) and poly(ethylene-co-vinyl alcohol) in solvents such as water or water-alcohol mixtures. Other examples include polyurethane in dimethylformamide (DMF), poly(vinylidene fluoride) in dimethyl formamide, polysulfone in DMF, poly(methyl methacrylate) with poly(ethylene glycol) in acetone, and polyamide in a water-ethanol mixture.

Although any combination of the particular compositions of phases that works may be used, the apparatus is particularly adapted for mixing and spray coating of two component systems such as those described in commonly assigned copending application Ser. No. 07/238,371 entitled "The Use of Asymmetric Membranes in Delivery Devices", the disclosure of which is hereby incorporated by reference.

The process by which the membrane is formed is a phase inversion process (R. E. Kesting, "Synthetic Polymeric Membranes," Wiley-Interscience, 2nd Ed., 1985). In this process a polymer solution is induced to undergo phase separation in a particular way, resulting in a structured, continuous polymer phase. In preparing the membrane of the present invention the process can be a wet process or a dry process.

The dry process provides an asymmetric membrane and utilizes a solvent system for the polymer and a pore-forming substance, which is a non-solvent for the polymer. The device is coated with a solution of polymer and pore-forming substance; however, in the dry process the solvent is allowed to evaporate completely. The successful formation of an asymmetric membrane using the dry process requires that the solvent or solvents evaporate more rapidly than the pore-forming substance. In addition, the pore-forming substance must not be a solvent for the polymer.

Solutions of polymers in volatile solvent mixtures suitable for the preparation of asymmetric membranes by the dry process must, of necessity, be susceptible to precipitation of the polymer upon even a slight evaporation of solvent. Thus, preferably the polymer solution is kept enclosed (e.g., not open to air) until the moment when it is desired to form the membrane.

Thus as described in the above-identified patent application and the above paragraphs, combinations of friable particles up to 2 mm preferably about 0.2 mm to about 2 mm and solution polymers in volatile solvents having viscosities of up to 1000 cps and above, preferably about 300 cps to about 1000 cps and above, are advantageously mixed and sprayed using the above described phase inversion process providing uniformly coated particles.

It has been found, unexpectedly, that typical atomizers for spray-drying as described in the background art do not perform well with the above described liquid-solid systems. Atomizers used in the current art are typically of the nozzle type or the centrifugal type. Both types, as currently implemented, are poorly adapted to spraying a slurry of solid particles in a viscous liquid. Typically, most designs involve a long and convoluted path for the liquid to be atomized, which leads to settling of the solid particles and blockage of the liquid path. Many designs, especially centrifugal atomizers also permit extensive contact between the drying atmosphere and the liquid feed prior to atomization, also resulting in rapid clogging of the equipment. It is believed that several properties of the components cause these problems In the instant apparatus the slurry is maintained substantially free from air contact.

In addition in typical spray drying equipment the solid and liquid are in contact for long periods of time. This can result in the dissolution of the solid by the solvent component of the liquid. In contrast, the instant apparatus minimizes the solid-liquid contact time, reducing that problem. Finally the high viscosity of the polymer solution typically reduces the effectiveness of current atomizers while the pumps of the present invention transports high viscosity liquids well.

According to the method of this invention (as exemplified in FIG. 8) the particulate solids are fed through inlet 815 to mixing channel 812 where the rotating surface contacts and drives the particles downstream. Typically the transport rate is about 0.01 kg/h to about 3.0 kg/h. After exiting the nozzle 824 outlet, the slurry stream is atomized by air streams exiting from the air outlets of the external mixing air atomizing nozzle 824. Typically slurry streams of about 0.01 kg/h to about 8 kg/h can be achieved with a nozzle outlet diameter of about 0.1 inch to about 0.15 inch. Slurry streams of about 1 kg/h to about 8 kg/h, for a nozzle outlet diameter of about 0.125 inch, can be achieved where other spray systems fail.

This invention provides rapid and efficient mixing of solid particles with a viscous liquid and transports the resulting slurry to a nozzle with minimal clogging and minimal residence time in the equipment. It also minimizes contact of the slurry with the surrounding atmosphere prior to spraying, thereby reducing undesirable effects, such as premature drying, oxidation, polymerization, degradation, etc.

It should be understood that the invention is not limited to the particular embodiments shown and described herein, but that various changes and modifications may be made without departing from the spirit and scope of this novel concept as defined by the following claims.

I claim:

1. An apparatus particularly adapted for mixing and spraying a slurry comprising:
   (a) a housing having a channel, an inlet, and an outlet;
   (b) said channel having an upstream and downstream end;
   (c) said channel being in fluid communication with said inlet at its upstream end;
   (d) said channel being in fluid communication with said outlet at its downstream end; and
   (e) said channel curving from its upstream end to its downstream end;
   (f) said outlet being in fluid communication with an air atomization nozzle;
   (g) a mixing surface capable of rotation with respect to said housing in a preselected rotation direction; and
   (h) said channel being disposed open to said mixing surface.

2. The apparatus as recited in claim 1 wherein said mixing surface is disposed on a rotatable disk, said channel is disposed substantially coplanar to said rotatable disk and said channel curves outward from its upstream end to its downstream end in the direction of rotation.

3. The apparatus as recited in claim 2 wherein said channel is defined by an inside channel wall surface and at said channel upstream end said channel wall is spaced apart from said disk during an entire rotation of said disk.

4. The apparatus as recited in claim 2 wherein said channel is open to said rotatable disk along its length.

5. The apparatus as recited in claim 2 wherein said channel's downstream end is immediately adjacent to said nozzle.

6. The apparatus as recited in claim 1 wherein said channel is substantially air tight.

7. The apparatus as recited in claim 1 wherein said mixing surface is disposed on a rotatable drum and said channel curves around said rotatable drum mixing surface from its upstream end to its downstream end.

8. The apparatus as recited in claim 7 wherein said channel is defined by an inside channel wall surface and at said channel upstream end said channel wall is spaced apart from said drum during an entire rotation of said drum.

9. The apparatus as recited in claim 7 wherein said channel is open to said rotatable drum along its length.

10. The apparatus as recited in claim 7 wherein said channel's downstream end is immediately adjacent to said nozzle.

11. The apparatus as recited in claim 7 wherein said channel is substantially air tight.

* * * * *